United States Patent
Kwak

(10) Patent No.: US 8,170,605 B2
(45) Date of Patent: May 1, 2012

(54) DUAL MODE MOBILE TERMINAL AND DATA CALL PROCESSING METHOD THEREOF

(75) Inventor: Hyun Joon Kwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 12/236,648

(22) Filed: Sep. 24, 2008

(65) Prior Publication Data

US 2009/0088200 A1  Apr. 2, 2009

(30) Foreign Application Priority Data

Oct. 1, 2007 (KR) .................. 10-2007-0098815

(51) Int. Cl.
*H04M 1/00* (2006.01)
*H01Q 11/12* (2006.01)
*H04B 1/04* (2006.01)
(52) U.S. Cl. ................... 455/552.1; 455/127.4
(58) Field of Classification Search ............... 455/552.1, 455/428, 436, 442, 127.4, 160.1
See application file for complete search history.

(56) References Cited

U.S. PATENT DOCUMENTS 7,181,237 B2 * 2/2007 Stockhusen ............... 455/552.1
7,797,437 B2 * 9/2010 Hovmark et al. ............. 709/230

* cited by examiner

*Primary Examiner* — Eugene Yun
(74) *Attorney, Agent, or Firm* — Jefferson IP Law, LLP

(57) ABSTRACT

An improved dual mode mobile terminal and data call processing method of the dual mode mobile terminal is provided for enabling a modem chip that is not associated or embedded with an application to process a data call. A data call processing method for a dual mode mobile terminal includes a first control unit associated with an application and a first data protocol stack, a second control unit associated with a second data protocol stack, and an input unit for receiving an input for selecting one of the first and second control units to process a data call, wherein when the second control unit is selected through the input unit, the second control unit opens a socket to couple the second data protocol stack to the application and processes the data call using the application and the second data protocol stack that are coupled with each other via the socket.

14 Claims, 4 Drawing Sheets

DUAL MODE MOBILE TERMINAL AND DATA CALL PROCESSING METHOD THEREOF

PRIORITY

This application claims the benefit under 35 U.S.C. §119(a) of a Korean patent application filed in the Korean Intellectual Property Office on Oct. 1, 2007 and assigned Serial No. 2007-0098815, the entire disclosure of which is hereby incorporated by reference.

BACKGROUND OF THE INVENTION

1. Field of the Invention

The present invention relates to a dual mode mobile terminal. More particularly, the present invention relates to an improved dual mode mobile terminal and data call processing method of the dual mode mobile terminal that enables a control unit to process a data call.

2. Description of the Related Art

With the increase in popularity and use of mobile terminals, mobile terminals are rapidly evolving to include feature-rich functions. A dual mode, or a dual standby mode, is one of these functions being included. A conventional dual mode mobile terminal operates in the networks of two different service providers in order to receive seamless services by roaming across the networks in a heterogeneous network environment.

Unlike a conventional single mode mobile terminal that enables communication services to be provided in the service coverage areas of a specific service provider, the dual mode mobile terminal enables the user to communicate in at least two different types of networks such as Code Division Multiple Access (CDMA) and Global System for Mobil communications (GSM) networks, thereby increasing utilization of mobile terminal.

A dual mode mobile terminal supporting CDMA and GSM is provided with a CDMA modem chip and a GSM modem chip such that one of the modem chips is configured as a master modem chip with an application and the other is as a slave modem chip. The application is associated with or embedded in only the master modem chip to increase memory utilization and reduce coding complexity.

However, the conventional dual mode mobile terminal has a drawback in that only the master modem chip can process data call. In other words, the slave modem chip cannot use the application of the master modem chip for data call processing. The slave modem chip cannot use the application of the master modem chip for data call processing because a large data exchange is difficult between the master and slave modem chips that operate in different data protocol stacks.

SUMMARY OF THE INVENTION

An aspect of the present invention is to address at least the above-mentioned problems and/or disadvantages and to provide at least the advantages described below. Accordingly, an aspect of the present invention is to provide a dual mode mobile terminal and data call processing method for the dual mode mobile terminal that enables a slave modem chip having no application to process a data call.

In accordance with an aspect of the present invention, a data call processing method for a dual mode mobile terminal is provided. The method includes selecting one of first and second control units for processing a data call, wherein the first control unit is associated with an application and a first data protocol stack and a second control unit is associated with a second data protocol stack, opening, when the second control unit is selected, a socket for coupling the application to the second data protocol stack, and processing, at the second control unit, the data call using the application and the second data protocol stack that are coupled with each other via the socket.

In accordance with another aspect of the present invention, a dual mode mobile terminal is provided. The terminal includes a first control unit associated with an application and a first data protocol stack, a second control unit associated with a second data protocol stack, and an input unit for receiving an input for selecting one of the first and second control units to process a data call, wherein when the second control unit is selected through the input unit, the second control unit opens a socket to couple the second data protocol stack to the application and processes the data call using the application and the second data protocol stack that are coupled with each other via the socket.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Dual Mode Mobile Terminal

Figure 1:
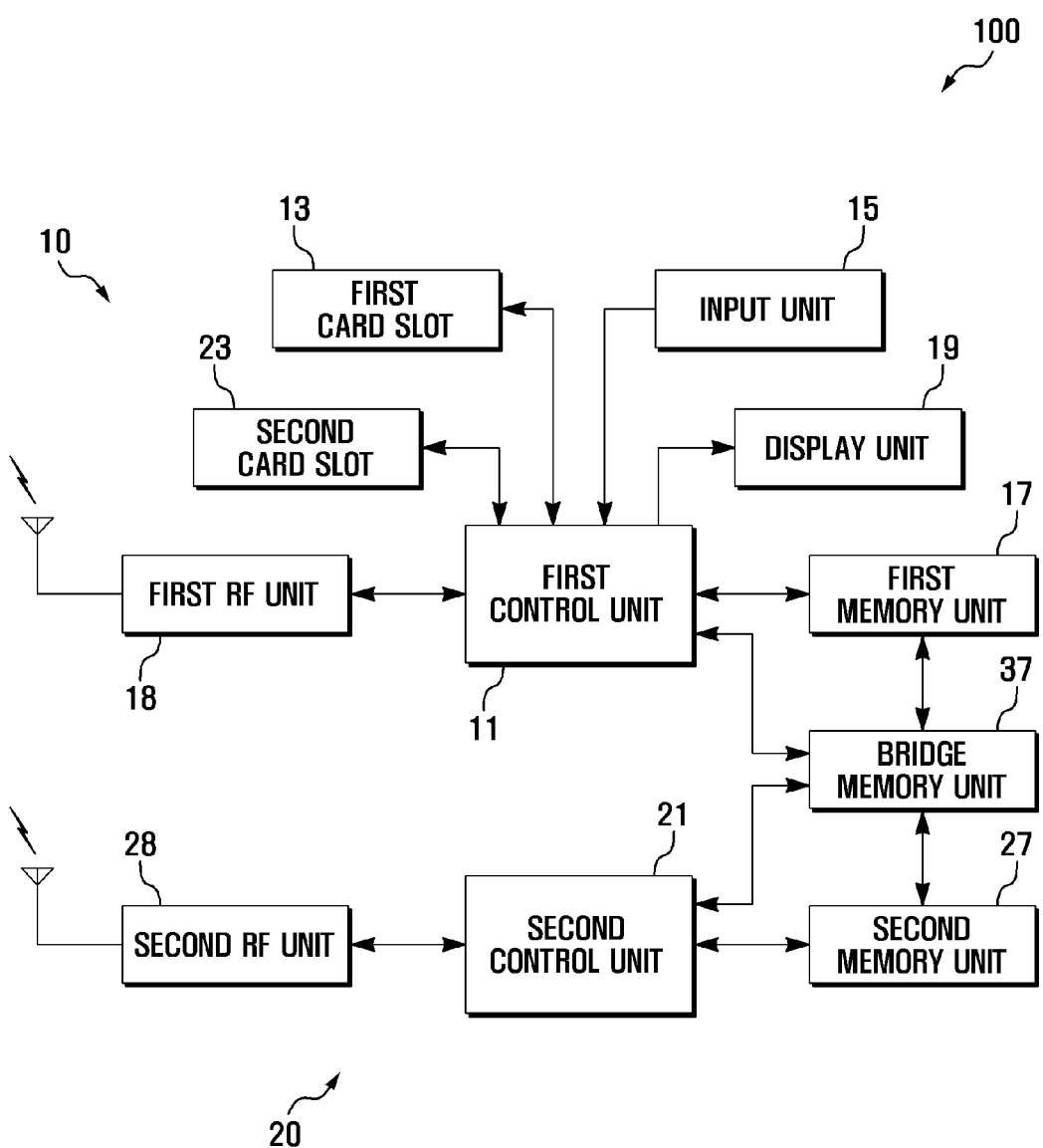
FIG. 1 is a block diagram illustrating a configuration of a dual mode mobile terminal according to an exemplary embodiment of the present invention.
Figure 2:
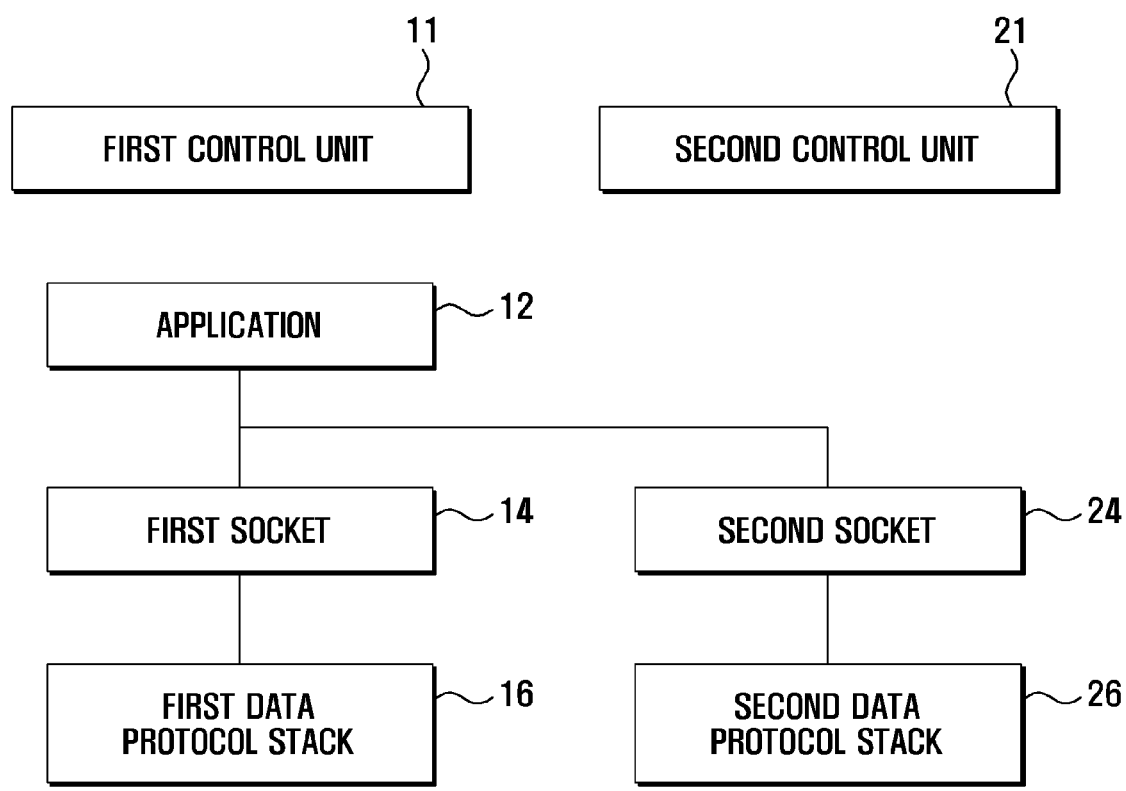
FIG. 2 is a block diagram illustrating interoperation between master and slave modem chips of a dual mode mobile terminal according to an exemplary embodiment of the present invention.

FIG. 1 is a block diagram illustrating a configuration of a dual mode mobile terminal according to an exemplary embodiment of the present invention. FIG. 2 is a block diagram illustrating interoperation between master and slave modem chips of a dual mode mobile terminal according to an exemplary embodiment of the present invention.

Referring to FIGS. 1 and 2, a dual mode mobile terminal 100 includes a first communication mode part 10 for driving the dual mode mobile terminal 100 in a first communication mode, a second communication mode part 20 for driving the dual mode mobile terminal 100 in a second communication mode, and a bridge memory unit 37 for coupling the first communication mode part 10 and the second communication mode part 20.

The first communication mode part 10 may include a first control unit 11, a first card slot 13, an input unit 15, a first memory unit 17, a first radio frequency (RF) unit 18, and a display unit 19. The second communication mode part 20 may include a second control unit 21, a second card slot 23, a second memory unit 27, and a second RF unit 28. The first control unit 11 is implemented with a master modem chip associated or embedded with an application 12 and a first data protocol stack 16. The second control unit 21 may be implemented with a slave modem chip equipped with a second data protocol stack 26 but no application. Since the first control unit 11 operates as master, the second card slot 23 may be coupled to the first control unit 11 in FIG. 1. However, the second card slot 23 can be coupled to the second control unit 21. The first and second memory units 17 and 27 and the bridge memory unit 37 may be collectively referred to as the "memory part."

Although the input unit 15 and display unit 19 are described as components of the first communication mode part 10 for simplifying the explanation, the input unit 15 and display unit 19 may also operate in association with the second communication mode part 20 and may additionally or alternatively be coupled to the second communication mode part 20.

The structures and functions of the first communication mode part 10 are described hereinafter in more detail.

The first control unit 11 may be a microprocessor for controlling the dual mode mobile terminal 100. The first control unit 11 may control data processing in the second communication mode part 20. The first control unit 11 can be implemented with any of a CDMA modem chip, a GSM modem chip, a Wireless Broadband (WiBro) modem chip, and a High Speed Downlink Packet Access (HSDPA) modem chip. In the described exemplary embodiment, the first control unit 11 is implemented with the CDMA modem chip.

The first card slot 13 may receive a first identity card used for the first communication mode. In the described exemplary embodiment, the first identity card is a CDMA User Identity Module (UIM) card.

The input unit 15 may be provided with a plurality of keys for manipulating the dual mode mobile terminal 100 and may output a key sequence to the first control unit 11 in response to user's key selection. The input unit 15 may receive user commands such as a data call processing mode execution command and a control unit selection command for selecting one of the first and second control units 11 and 21 to process a data call. The input unit 15 can be implemented using at least one of a keypad, a touchpad, and a touch screen.

The first memory unit 17 may store application programs associated with the operation of the first communication mode part 10 and data generated during the operation of the application programs. The first memory unit 17 can be implemented with at least one of various volatile and nonvolatile memory devices. More particularly in the described exemplary embodiment, the first memory unit 17 may store the application 12 for processing the data calls and the data generated during the data call processing. The first memory unit 17 may also store system programs for implementing the first data protocol stack. The first memory unit 17 may also store a Berkeley Software Distribution (BSD) type socket program for coupling the first data protocol stack 16 to the application 12 when data call processing of the first control unit 11 is requested. Hereafter, the socket program coupling the first application 12 and the first data protocol stack 16 may collectively be referred to as first socket 14.

The first RF unit 18 may be responsible for radio communication in the first communication mode. The first RF unit 18 may modulate, up-convert a transmission signal output by the first control unit 11 and transmit the transmission signal through an antenna and may down-convert, low-noise-amplify a radio signal received through the antenna and output the received signal to the first control unit 11.

The display unit 19 may display various menus associated with the functions provided by the dual mode mobile terminal 100 and video data stored in the memory part 17, 27, and 37. The display unit 19 may display a processor selection screen for selection by a user of one of first and second control units 11 and 21 for processing the data call. The display unit 19 can be implemented with a Liquid Crystal Display (LCD). More particularly, the display unit 19 may be implemented with a touchscreen-enabled LCD. In the case that the touchscreen-enabled LCD is used, the display unit 19 can be used as a part of the input unit 15 as well as display unit 19.

The structures and functions of the second communication mode part 20 are described hereinafter in more detail.

The second control unit 21 may be a microprocessor for controlling the second communication mode part 20. The second control unit 21 may process a data call in response to a request by the first control unit 11. The second control unit 21 can be implemented with any of a CDMA modem chip, a GSM modem chip, a WiBro modem chip, and a HSDPA modem chip. In the described exemplary embodiment, the second control unit 21 is implemented with the GSM modem chip.

The second card slot 23 mat receive a second identity card used for the second communication mode. In the described exemplary embodiment, the second identity card is a GSM Subscriber Identity Module (SIM) card. When one of the first and second card slots 13 and 23 has received an identity card, the dual mode mobile terminal 100 may be configured to operate in a communication mode base on the identity card. When both the first and second slots 13 and 23 has received corresponding identity cards, the dual mode mobile terminal 100 may be configured to operated in at least one of the first and second communication modes.

The second memory unit 27 may store an application program associated with operations of the second communication mode part 20 and data generated while the application program executes. The second memory unit 27 can be implemented with at least one of various volatile and nonvolatile memory devices. In the described exemplary embodiment, the second memory unit 27 may store a system program for implementing the second data protocol stack 26. The second memory unit 27 may also store a Berkeley Software Distribution (BSD) type socket program for coupling the first data protocol stack 26 to the application 12 when data call processing of the first control unit 11 is requested. Hereafter, the socket program coupling the application 12 and the second data protocol stack 26 may collectively be referred to as second socket 24.

The second RF unit 28 may be responsible for radio communication in the second communication mode. The second RF unit 28 may modulate, up-convert a transmission signal output by the second control unit 21 and transmit the transmission signal through an antenna and may down-convert, low-noise-amplify a radio signal received through the antenna and output the receive single to the second control unit 21.

The bridge memory 37 allows the first and second control units 11 and 21 to store and access the data simultaneously. The bridge memory 27 can be implemented with a Dual Ported Random Access Memory (DPRAM).

In the described exemplary embodiment, if the second control unit 21 is selected for processing a data call, the second control unit 21 may control to open the second socket 24 for coupling the application 12 and the second data protocol stack 26 so that the data call is processed using the application 12 and the second protocol stack 26. At this time, the first control unit 11 may send a second socket open command to the bridge memory unit 37 and the bridge memory unit 37 may then forward the second socket open command to the second control unit 21 so that the second control unit 21 may open the second socket 24.

On the other hand, if the first control unit is selected for processing a data call, the first control unit 11 may open the first socket 14 for coupling the application 12 and the first data protocol stack 16 so that the data call may be processed using the application 12 and the first protocol stack 16.

As described above, a dual mode mobile terminal of an exemplary embodiment of the present invention enables the second control unit 12 to process a data call, though the application 12 that may reside in the first control unit 11.

Data Call Processing Method

Figure 3:
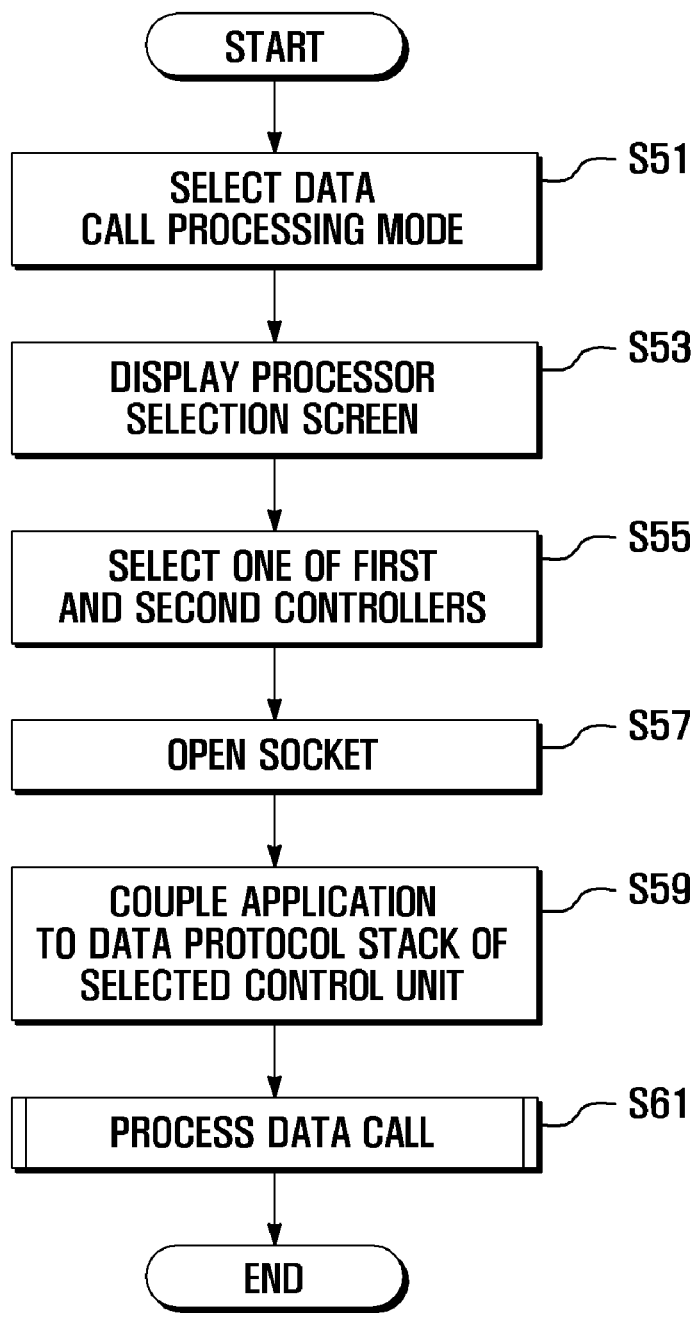
FIG. 3 is a flowchart illustrating a data call processing method according to an exemplary embodiment of the present invention.

FIG. 3 is a flowchart illustrating a data call processing method according to an exemplary embodiment of the present invention. The following description may further clarify the structures and functions of the dual mode mobile terminal illustrated in FIG. 1.

Referring to FIG. 3, the mobile terminal 100 may detect a key input for activating a data call processing mode in step S51. If the data call processing mode activation key input is detected, the mobile terminal may display a processor selection screen for enabling a user to select one of the first and second control units 11 and 21 in step S53. At this time, the first and second control units 11 and 21 may be displayed in the form of a text item list or as icons.

Next, the mobile terminal 100 may receive a user selection key input through the input unit 15 and may select one of the first and second control units 11 and 21 according to the user selection key input in step S55. Once a control unit 11 or 21 is selected, the selected control unit 11 or 21 may open a socket 14 or 24 for coupling the application 12 and the data protocol stack 16 or 26 in step S57. In a case where the second control unit 21 is selected, the first control unit 11 may send a second socket open command to the bridge memory unit 37, and the bridge memory unit 37 may forward the second socket open command to the second control unit 21 so that the second control unit 21 may open the second socket 24 according to the second socket open command.

After the socket 14 or 24 is opened, the selected control unit 11 or 21 may couple the application 12 and the data protocol stack 16 or 26 of the selected control unit 11 or 21 via the opened socket 14 or 24 in step S59.

Next, the selected control unit 11 21 may perform the data call processing using the application 12 and the data protocol stack 16 or 26 in step S61. In a case where the second data protocol stack is coupled to the application 12, the second control unit 21 may perform the data call processing, even though the application 12 is associated with or embedded in the first control unit 11.

The data call processing procedure in step S61 is described hereinafter in more detail in association with the execution of a data writing command. It is assumed that the second control unit 21 is selected for performing the data call processing.

Figure 4:
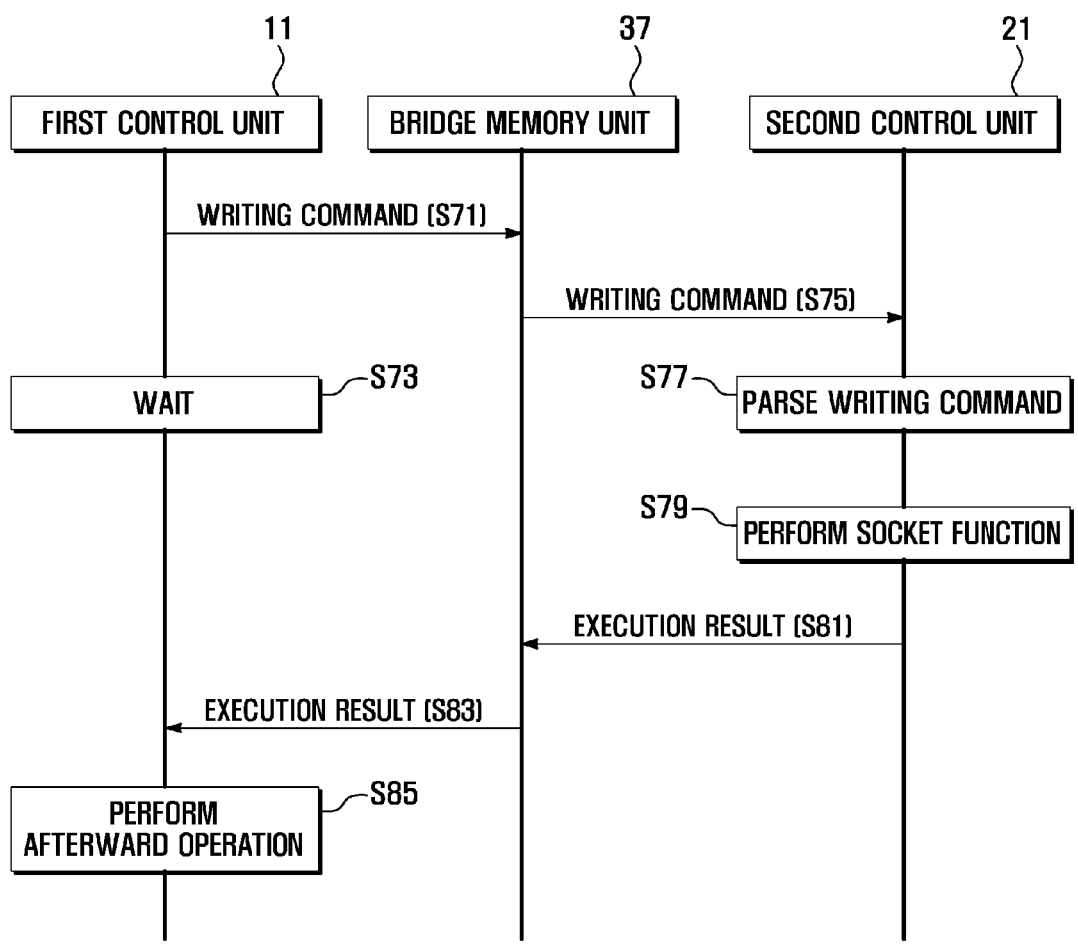
FIG. 4 is a message flow diagram illustrating a data call processing procedure of a data call processing method according to an exemplary embodiment of the present invention.

FIG. 4 is a message flow diagram illustrating a data call processing procedure of a data call processing method according to an exemplary embodiment of the present invention. The data call processing procedure illustrated in FIG. 4 may be the data call processing procedure of step S61 of the data call processing method illustrated in FIG. 3.

Referring to FIG. 4, after the application is coupled to the second data protocol stack 26, the first control unit 11 may send a writing command to the bridge memory unit 37 through a first Inter-Process Communications (IPC) interface in step S71. That is, the first control unit 11 may create a writing command destined to second control unit 21 and may send the writing command to the bridge memory 37 through the first IPC interface. After sending the writing command, the first control unit 11 may wait until a command execution result is received from the second control unit 21 on the first IPC interface in step S73.

Upon receipt of the writing command, the bridge memory unit 37 may forward the writing command to the second control unit 21 via a second IPC interface in step S75. If the writing command is received, the second control unit 21 may parse the writing command into a second socket command in step S77 and may execute the second socket command in step S79. That is, the second control unit 21 may decompose the writing command into parameters and may execute the second socket function with reference to the parameters.

After execution the second socket function, the second control unit 21 may send the command execution result to the bridge memory unit 37 through the second IPC interface in step S81.

Upon receipt of the command execution result, the bridge memory unit 37 may forward the command execution result to the first control unit 11 trough the first IPC interface in step S83. If the command execution result is received, the first control unit 11 may perform an afterward operation using the application in step S85.

Certain aspects of the present invention can also be embodied as computer readable code on a computer readable recording medium. A computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. In addition, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the present invention as defined by the appended claims and their equivalents.

As described above, the data call processing method of exemplary embodiments of the present invention allow an application associated with or embedded in a mast modem chip to couple to a slave modem chip by means of socket so that the slave modem chip can process data calls without an associated or embedded application.

What is claimed is:

1. A data call processing method for a dual mode mobile terminal, the method comprising:
    selecting one of first and second control units of the dual mode mobile terminal for processing a data call, wherein the first control unit is associated with an application and a first data protocol stack and a second control unit is associated with a second data protocol stack;
    opening, when the second control unit is selected, a socket for coupling the application to the second data protocol stack; and
    processing, at the second control unit, the data call using the application and the second data protocol stack that are coupled with each other via the socket.

2. The method of claim 1, wherein the first control unit waits until an execution result is received from the second control unit on a first Inter-process Communications (IPC) interface.

3. The method of claim 2, further comprising:
    receiving the execution result from the second control unit; and
    performing an afterward operation according to the execution result.

4. The method of claim 1, wherein the socket is opened based on a Berkeley Software Distribution (BSD) platform.

5. The method of claim 1, wherein the opening of the socket comprises:
    transmitting a socket open command from the first control unit to a Dual Ported Random Access Memory (DPRAM);
    transmitting the socket open command from the DPRAM to the second control unit; and
    opening the socket according to the socket open command under the control of the second control unit.

6. The method of claim 1, wherein the selecting of one of the first and second control units comprises:
    displaying a solicitation to select one of the first and second control units; and
    selecting the second control unit according to an input in response to the solicitation.

7. The method of claim 1, wherein each of the first and second control units is one of a Code Division Multiple Access (CDMA) modem chip, a Global System for Mobil communications (GSM) modem chip, a Wireless Broadband (WiBro) modem chip, and a High Speed Downlink Packet Access (HSDPA) modem chip.

8. A dual mode mobile terminal, the terminal comprising:
    a first control unit associated with an application and a first data protocol stack;
    a second control unit associated with a second data protocol stack; and
    an input unit for receiving an input for selecting one of the first and second control units to process a data call,
    wherein when the second control unit is selected through the input unit, the second control unit opens a socket to couple the second data protocol stack to the application and processes the data call using the application and the second data protocol stack that are coupled with each other via the socket.

9. The terminal of claim 8, wherein the first control unit waits until an execution result of the data call processing is received from the second control unit on a first Inter-Process Communications (IPC) interface.

10. The terminal of claim 9, wherein the first control unit receives the execution result from the second control unit and performs an afterward operation according to the execution result.

11. The terminal of claim 8, wherein the second control unit opens the socket based on a Berkeley Software Distribution (BSD) platform.

12. The terminal of claim 8, wherein the first control unit transmits a socket open command to the second control unit via a Dual Ported Random Access Memory (DPRAM), and the second control unit opens the socket according to the socket open command.

13. The terminal of claim 8, further comprises a display unit for displaying a solicitation to select one of the first and second control units through the input unit.

14. The terminal of claim 8, wherein each of the first and second control unit is one of a Code Division Multiple Access (CDMA) modem chip, a Global System for Mobil communications (GSM) modem chip, a Wireless Broadband (WiBro) modem chip, and a High Speed Downlink Packet Access (HSDPA) modem chip.

* * * * *